United States Patent Office 3,012,040
Patented Dec. 5, 1961

3,012,040
PROCESS FOR N-ALKYLATION OF INDOLES
Charles J. Lind, Hamburg, and Allen Walter Sogn, Williamsville, N.Y., assignors to Allied Chemical Corporation, New York, N.Y., a corporation of New York
No Drawing. Filed Oct. 15, 1958, Ser. No. 767,289
6 Claims. (Cl. 260—319)

This invention relates to a process for the N-alkylation of indoles (that is, indole and its derivatives). In particular, it is concerned with an improved process for the preparation of N-lower alkyl indoles, and especially 1-methyl-2-phenyl-3-indolecarboxaldehyde.

The N-alkyl indoles are well known chemical intermediates. Heretofore they have been obtained by processes which are objectionable for one or more reasons; as for example, poor yields, use of difficulty obtainable and sensitive materials, use of unduly excessive amounts of costly reagents, difficulty of controlling the reaction, and use of vacuum distillation to maintain the reaction mixture substantially anhydrous.

Thus it is known to prepare 1-methyl-2-phenyl-3-indolecarboxaldehyde by adding dimethyl sulfate to a suspension of 2-phenyl-3-indolecarboxaldehyde in aqueous potassium hydroxide. Owing to the fact that this reaction is strongly exothermic, the reaction mixture foams, the reaction is erratic, is difficult to control and requires excessive amounts of dimethyl sulfate (220%–700% excess).

According to U.S.P. 2,460,745, a mixture of the indole is heated with aqueous caustic potash solution and toluene (or other solvent for the indole which forms an azeotropic mixture with water) until the water is removed by joint distillation with the toluene, and a dialkyl sulfate is added while refluxing the mixture under vacuum and distilling off water formed in the reaction, by vacuum azeotropic distillation with the toluene. This process has the objections of requiring vacuum operation and the use of two or more mols of the dialkyl sulfate per mol of indole, as well as requiring the use of a sufficiently large amount of toluene or other solvent to dissolve all of the initial indole and to remove all of the water, present and formed in the reaction, by azeotropic distillation.

An object of the present invention is to provide an improved process for the N-alkylation of indoles.

Another object of the present invention is to provide a process for the N-alkylation of indoles which is easily controlled and convenient and economical to operate.

Further objects of the present invention are to provide a process for the N-alkylation of indoles whereby high yields of N-alkyl indoles can be obtained, and whereby purer, more uniform products can be obtained.

An additional object of the present invention is to provide a process for the N-alkylation of indoles whereby only a small excess of the alkylating agent is required.

Other objects of the present invention are to provide a process for the production of high yields of 1-methyl-2-phenyl-3-indolecarboxaldehyde in a purer, more uniform form, which process is easily controlled and convenient and economical to operate.

Still other objects of the invention will in part be obvious and will in part appear hereinafter.

According to the present invention, in the process of producing an N-alkyl indole wherein an alkylating agent is reacted with an indole having a free N-hydrogen atom, in the presence of an alkali metal hydroxide, the above objects are accomplished by adding the alkylating agent to a warm suspension of the indole in a mixture of an aqueous solution of the alkali metal hydroxide and a water-immiscible, inert organic liquid which is a solvent for the N-alkyl indole at the reaction temperature (which functions as a diluent), and maintaining the mixture at alkylating temperature. Preferably, the mixture is warmed to about 45° C. before adding the alkylating agent.

We have discovered, by having present in the reaction mixture a water-immiscible organic liquid which is a solvent for the N-alkyl indole at the reaction temperature, that water may be present in the reaction mixture in large amounts without adversely affecting the yield or quality of the resulting N-alkyl indole. Thus the alkali metal hydroxide may be present in the form of such dilute aqueous solutions as 10% solutions by weight.

In the preferred practice of the process of the present invention, the indole to be N-alkylated is suspended in a mixture of an aqueous solution of a caustic alkali and a water-immiscible, inert organic liquid which is a solvent for the N-alkyl indole at the reaction temperature, which mixture is preferably warmed to the alkylating temperature, the alkylating agent is gradually added to the mixture, while stirring to obtain intimate contact of the components of the reaction mixture and with cooling or heating as required to control the alkylating temperature; and the resulting mixture is maintained at alkylating temperature until the alkylation is substantially completed, as evidenced for example by the melting point or setting point of the N-alkyl indole.

After the alkylation reaction is completed, the N-alkyl indole, which is dissolved in the organic liquid diluent, is recovered. For example, the organic liquid diluent is removed, as by steam distillation, and the N-alkyl indole is recovered from the remaining aqueous alkali solution, as by filtration, decantation, etc.

The process of the present invention can be employed for the N-alkylation of various indoles, a number of which have been N-alkylated heretofore. It is useful particularly for the N-alkylation of indoles which are represented by the general formula:

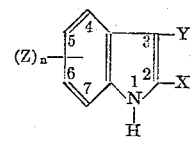

wherein

X represents a radical selected from the group consisting of alkyl, aryl, alkoxy, aryloxy and $$-\overset{O}{\underset{\|}{C}}-R$$

wherein R is selected from the group consisting of hydrogen, alkyl and aryl;
Y represents a member of the group consisting of hydrogen and the radicals represented by X;
Z represents a member of the group consisting of hydrogen, alkyl and aryl; and
n is a whole number not greater than 2.

Examples of such indoles are:

2-ethyl-3-propylindole
3-butyl-2-ethyl-5-methylindole
2,5-diphenyl-3-methylindole
2-methoxy-3-propoxyindole
3-ethoxy-2-methoxy-5-phenylindole
2-methoxy-3-phenoxyindole
2-phenyl-3-indolecarboxaldehyde
5-methyl-2-phenyl-3-indolecarboxaldehyde (3-formyl-5-methyl-2-phenylindole)
3-ethyl-2-indolecarboxaldehyde
3-ethyl-5-methyl-2-indolecarboxaldehyde
5-methyl-3-phenoxy-2-indolecarboxaldehyde 3-phenoxy-7-phenyl-2-indolecarboxaldehyde
1-(3-ethyl-2-indolyl)-1propanone (3-ethyl-2-propionylindole)
1-(2-phenyl-3-indolyl)-1-ethanone (2-phenyl-3-acetylindole)
1-(3-ethyl-5-methyl-2-indolyl)-1-butanone (2-butyryl-3-ethyl-5-methylindole)

Any of the usual alkylating agents can be used in carrying out the process. We prefer to employ as alkylating agents alkyl esters, and especially lower dialkyl sulfates, such as dimethyl-sulfate and diethyl-sulfate. Other suitable alkylating agents are exemplified by the following:

Methyl iodide
Methyl benzenesulfonate
Methyl-p-toluenesulfonate
n-Butyl-p-brombenzene sulfonate, and
Higher alkyl sulfoxy esters.

The alkylating agent is used in an amount in excess of that theoretically required, in order to insure completion of the alkylation. It is a feature of the present invention that the large excesses heretofore required are not necessary in the practice of the present invention. Thus an amount of alkylating agent equal to about 1.4 to about 1.8 mols per mol of indole to be alkylated is adequate and is preferred; although larger amounts may be employed, such as 6 or more mols, if desired. (All ranges disclosed herein are inclusive of the limits.)

Various alkali metal hydroxides, and especially the caustic alkalis (sodium and potassium hydroxides), may be employed, as heretofore. Sodium hydroxide is preferred because of its lower cost.

The amount of alkali metal hydroxide employed is in excess of that theoretically required. Preferably amounts ranging from about 6 to about 15 mols of alkali metal hydroxide, per mol of indole to be alkylated, are used; lesser amounts reduce the rate of alkylation whereas larger amounts are unnecessary, and hence wasteful.

Sufficient water is employed to dissolve all of the alkali metal hydroxide at the alkylation temperature. From the standpoint of efficient operation, the alkali metal hydroxide is preferably employed in the form of an aqueous solution of at least 10% strength, by weight, and especially at least 30% strength, by weight; solutions which are too dilute tend to slow down the rate of the reaction and to increase the extent of hydrolysis of dialkyl sulfates, whereas at the high concentrations of alkali metal hydroxide the hydrolysis of the dialkyl sulfates is retarded.

Any water-immiscible organic liquid which is a solvent for the N-alkyl indole at the alkylation temperature, and which is inert (that is, non-reactive with the components of the reaction mixture) can be used as the diluent in the reaction mixture. Examples of such organic diluents are the aromatic hydrocarbons (such as benzene, toluene and xylene) and their substituted derivatives (such as chlorobenzene and nitrobenzene). Preferably amounts equal to about 2 to about 4 times the weight of the indole to be alkylated are employed.

The alkylation can be carried out at the various alkylation temperatures heretofore employed for the purpose. Preferably temperatures of approximately 60° C., and especially 60°–65° C., are employed because they permit the exothermic reaction to be controlled readily, and there is a lesser tendency of the alkylating agents, and especially dialkyl sulfates, to hydrolyze at said temperatures than at higher temperatures, such as the boiling point of the mixture at atmospheric pressure.

The process of the present invention is of special utility in connection with the manufacture of 1-methyl-2-phenyl-3-indolecarboxaldehyde from 2-phenyl-3-indolecarboxaldehyde. In the preferred practice thereof for said manufacture, about 1.4 to about 1.8 mols of dimethyl sulfate are added gradually to a well stirred suspension of 1 mol of 2-phenyl-3-indolecarboxaldehyde in a mixture of about 6 to about 15 mols of caustic alkali per mol of the phenyl-indolecarboxaldehyde, in the form of an aqueous solution of at least 30% strength, and 2 to 4 parts by weight of monochlorobenzene per part by weight of phenylindolecarboxaldehyde, which has been warmed to about 60° C. After termination of the exothermic reaction, which occurs after a time and which is controlled by cooling, the reaction mixture is heated further at 60°–65° C., if necessary, to complete the alkylation; and the resulting 1-methyl-2-phenyl-3-indolecarboxaldehyde, which is present as a solution in the chlorobenzene, is recovered. Since the N-methyl-phenyl-indolecarboxaldehyde is insoluble in water and aqueous alkaline solutions, it is preferably recovered by removing the chlorobenzene from the reacted mixture by steam distillation, filtering it off, and washing the filter cake with water.

The invention will be illustrated by the following specific examples, but it is to be understood that it is not limited to the details thereof and that changes may be made without departing from the scope of the invention. The temperatures are in degrees centigrade and the parts and percentages are by weight.

*Example 1*

A mixture consisting of 1580 parts of monochlorobenzene and 1150 parts of an aqueous paste containing 633 parts of 2-phenyl-3-indolecarboxaldehyde (2.86 mols) is charged to a reaction vessel provided with a stirrer and heating and cooling means, and the mixture is stirred for 10–15 minutes at atmospheric pressure to obtain a uniform slurry. To the agitated slurry at room temperature are charged slowly 2290 parts of a 49.9° Bé. aqueous caustic soda (28.6 mols of NaOH). The temperature of the mixture "kicks" about 15°. The mass is heated to 60°–62° over a period of 20 minutes and, while maintaining the said temperature by cooling or heating, as necessary, a total of 595 parts of dimethyl sulfate (4.72 mols) is added over a period of about 45 minutes and the resulting mass is stirred for an additional 45-minute period. A strongly exothermic reaction occurs after a portion of the dimethyl sulfate has been added, but heating may be required toward the end of the reaction period.

The mixture thus obtained, containing 1-methyl-2-phenyl-3-indolecarboxaldehyde dissolved in the chlorobenzene, is drowned in 1450 parts of cold (10°–20°) water over a period of about 45 minutes. The resultant aqueous mixture is steam distilled to remove the monochlorobenzene. The residue after steam distillation is cooled to 15°–30° and filtered. The filter cake of 1-methyl-2-phenyl-3-indolecarboxaldehyde is washed with cold water (about 8000 parts), until the filtrate is alkali-free to Nitrazine Yellow. The washed cake is dried in an air-circulating drier at 60°–65° to constant weight. A yield of 662 parts (98.3% of theory) of 1-methyl-2-phenyl-3-indolecarboxaldehyde of melting point 125°–126° is obtained.

From this example it is seen that the 1-methyl-2-phenyl-3-indolecarboxaldehyde obtained in accordance with the present invention in substantially theoretical yield is of such purity (high melting point) that additional purification, such as recrystallization from alcohol, is not required, in contrast with the indole obtained by the processes heretofore proposed. Furthermore, when the methylation is carried out in the manner described in above Example 1, but in the absence of the monochlorobenzene, about four times more dimethyl sulfate is required than is used in Example 1, and the 1-methyl-2-phenyl-3-indolecarboxaldehyde thereby obtained has a melting point of only 117°–119°.

*Example 2*

A reaction vessel of the type employed in Example 1 is charged with 513 parts of monochlorobenzene and 179 parts of dry 2-phenylindole. To the resulting mixture, at room temperature, 740 parts of 50° Bé. aqueous caustic soda solution are slowly added with stirring. The mass is heated to 60°–62° over a period of 20 minutes; and, while maintaining said temperature by cooling or heating, as necessary, a total of 192.5 parts of dimethyl sulfate are added with stirring over a period of about 45 minutes and the resulting mass is stirred for an additional 45-minute period. The resulting 1-methyl-2-phenylindole is recovered by drowning in 1880 parts of cold water, removing the chlorobenzene by steam distillation, filtering, and washing the filter cake, as in Example 1, employing 2583 parts of water as a first wash and 3000 parts of water as a second wash. A yield of 1-methyl-2-phenylindole equal to 97.5% of the theoretical is obtained.

Example 3

The process of Example 2 is repeated with 134.5 parts of 2,3-dimethylindole instead of the 2-phenylindole. A yield of 1,2,3-trimethylindole approaching the theoretical amount is obtained by fractional distillation of the oil layer obtained after removal of the chlorobenzene by steam distillation of the drowned mass, washing of the oil layer which separates on standing, with 2583 parts of water, and permitting the mixture to stand.

It will be evident that the invention is not limited to the details of the foregoing illustrative examples and that changes can be made without departing from the scope of the invention.

Thus, instead of the indoles employed in the above specific examples, any of the other indoles referred to above may be substituted in equivalent amount.

While it is simpler and easier to employ the indole in the free form (that is, having a free N-hydrogen atom), as in the above examples, it is possible to prepare the alkali metal salt of the indole separately and employ it in the process, if desired. Hence, it is to be understood, where in the specification and claims the indole to be alkylated is referred to as "having a free N-hydrogen atom," that the corresponding alkali metal salt thereof is included.

Other water-immiscible, inert organic liquids referred to above may be substituted for the chlorobenzene used in the examples. Further, if desired, potassium hydroxide can replace the sodium hydroxide used in the examples.

Since changes may be made in carrying out the above process without departing from the scope of the invention, it is intended that all matter contained in the above description shall be interpreted as illustrative and not in a limiting sense, except as limited by the claims.

We claim:

1. The process of producing an N-alkyl indole by reacting an alkylating agent selected from the group consisting of lower dialkyl sulfates, methyl iodide, methyl benzenesulfonate, methyl-p-toluenesulfonate, and normal-butyl-p-brombenzene sulfonate with an indole having the formula:

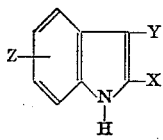

wherein

X represents a radical selected from the group consisting of lower alkyl, lower alkoxy, phenyl, phenoxy and

(R being selected from the group consisting of hydrogen, lower alkyl and phenyl);

Y represents a member selected from the group consisting of hydrogen and the radicals represented by X; and Z represents a member selected from the group consisting of hydrogen, lower alkyl and phenyl, which comprises adding the alkylating agent to a warm suspension of the indole in a mixture of an aqueous solution of an alkali metal hydroxide and a water-immiscible, inert organic liquid which is a solvent for the N-alkyl indole at the reaction temperature, said aqueous solution of alkali metal hydroxide containing 6 to 15 mols of alkali metal hydroxide per mol of indole and sufficient water to form an aqueous solution of 10% to 50% strength by weight and the amount of inert organic liquid being sufficient to dissolve the resulting N-alkyl indole at the reaction temperature, and maintaining the resulting mixture at a reaction temperature of 60° to 65° C. while retaining the water in the mixture.

2. The process of producing an N-alkyl indole, which comprises gradually adding a total of 1.4 to 1.8 mols of a lower dialkyl sulfate to a suspension of 1 mol of an indole having the formula set out in claim 1 in a mixture of 2 to 4 parts, per part by weight of the indole, of a water-immiscible, inert organic liquid which is a solvent for the N-alkyl indole at the reaction temperature and 6 to 15 mols of caustic alkali in the form of an aqueous solution of 30% to 50% strength by weight, maintaining the resulting mixture at a reaction temperature within the range 60° to 65° C. and at atmospheric pressure, while retaining the water in the mixture, until the reaction is substantially complete.

3. The process of producing 1-alkyl-2-phenyl-3-indolecarboxaldehyde, which comprises adding an alkylating agent as defined in claim 1 to a warm suspension of 2-phenyl-3-indolecarboxaldehyde in a mixture of an aqueous solution of an alkali metal hydroxide and a water-immiscible, inert organic liquid which is a solvent for the 1-alkyl-2-phenyl-3-indolecarboxaldehyde at the reaction temperature, said aqueous solution of alkali metal hydroxide containing 6 to 15 mols of alkali metal hydroxide per mol of 2-phenyl-3-indolecarboxaldehyde in sufficient water to form an aqueous solution of 10% to 50% strength by weight and the amount of water-immiscible, inert organic liquid being sufficient to dissolve the resulting 1-alkyl-2-phenyl-3-indolecarboxaldehyde at the reaction temperature, and maintaining the resulting mixture at a reaction temperature of 60° to 65° C., while retaining the water in the mixture, until the reaction is substantially complete.

4. The process of producing 1-alkyl-2-phenyl-3-indolecarboxaldehyde, which comprises gradually adding a total of about 1.4 to about 1.8 mols of a lower dialkyl sulfate to a suspension of 1 mol of 2-phenyl-3-indolecarboxaldehyde in a mixture of a water-immiscible, inert organic liquid which is a solvent for the 1-alkyl-2-phenyl-3-indolecarboxaldehyde and 6 to 15 mols of caustic alkali, in the form of an aqueous solution of 30% to 50% strength by weight, while maintaining the temperature of the reaction mixture at 60° to 65° C., and maintaining the resulting mixture at said temperature, while retaining the water in the mixture until the reaction is substantially complete.

5. The process of producing 1-methyl-2-phenyl-3-indolecarboxaldehyde as defined in claim 4, which comprises adding dimethyl sulfate to a suspension of 2-phenyl-3-indolecarboxaldehyde in a mixture of monochlorobenzene and an aqueous solution of sodium hydroxide.

6. The process of producing 1-methyl-2-phenyl-3-indolecarboxaldehyde, which comprises gradually adding a total of 1.4 to 1.8 mols of dimethyl sulfate to a suspension of 1 mol of 2-phenyl-3-indolecarboxaldehyde in a mixture of 2 to 4 parts of monochlorobenzene, per part by weight of the phenyl-indolecarboxaldehyde, and 6 to 15 mols of caustic alkali in the form of an aqueous solution of 30% to 50% strength by weight, while maintaining the temperature of the mixture within the range 60° to 65° C., and maintaining the resulting reaction mixture at a temperature within said range and atmospheric pressure, while retaining the water in the reaction mixture, until the reaction is substantially complete.

References Cited in the file of this patent

UNITED STATES PATENTS

| | | |
|---|---|---|
| 2,460,745 | Grimmel et al. | Feb. 1, 1949 |
| 2,528,940 | Wright | Nov. 7, 1950 |
| 2,750,417 | Closson et al. | June 12, 1956 |

FOREIGN PATENTS

| | | |
|---|---|---|
| 509,455 | Great Britain | July 17, 1939 |
| 855,563 | Germany | Nov. 13, 1952 |

OTHER REFERENCES

Use of Solvents, MacArdle, D. Van Nostrand Co., New York, pp. 124–125 (1925).